US009556376B2

(12) United States Patent
Huang et al.

(10) Patent No.: US 9,556,376 B2
(45) Date of Patent: *Jan. 31, 2017

(54) SOLIDS SUSPENSION WITH NANOPARTICLE-ASSOCIATED VISCOELASTIC SURFACTANT MICELLAR FLUIDS

(75) Inventors: Tianping Huang, Spring, TX (US); James B. Crews, Willis, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1124 days.

This patent is subject to a terminal disclaimer.

(21) Appl. No.: 12/042,439

(22) Filed: Mar. 5, 2008

(65) Prior Publication Data

US 2008/0153720 A1    Jun. 26, 2008

Related U.S. Application Data

(63) Continuation-in-part of application No. 11/849,820, filed on Sep. 4, 2007, now Pat. No. 8,278,252, and a continuation-in-part of application No. 11/125,465, filed on May 10, 2005, now Pat. No. 7,343,972, application No. 12/042,439, which is a

(60) Provisional application No. 60/845,916, filed on Sep. 20, 2006, provisional application No. 60/570,601,
(Continued)

(51) Int. Cl.
C09K 8/05 (2006.01)
C09K 8/68 (2006.01)

(52) U.S. Cl.
CPC ............. C09K 8/68 (2013.01); C09K 2208/10 (2013.01); C09K 2208/30 (2013.01)

(58) Field of Classification Search
None
See application file for complete search history.

(56) References Cited

U.S. PATENT DOCUMENTS 3,660,183 A * 5/1972 Knowles et al. ............... 149/21
3,701,384 A * 10/1972 Routson et al. ............. 166/292
4,931,195 A * 6/1990 Cao et al. .................... 510/304
(Continued)

OTHER PUBLICATIONS

U.S. Appl. No. 11/608,035, filed Dec. 7, 2006, Huang.
C. H. Bivins, et al., "New Fibers for Hydraulic Fracturing," Oilfield Review, Summer 2005, pp. 34-43.

*Primary Examiner* — John J Figueroa
(74) *Attorney, Agent, or Firm* — Mossman Kumar & Tyler PC

(57) ABSTRACT

An aqueous, viscoelastic fluid gelled with a viscoelastic surfactant (VES) may suspend solids such as proppants, gravel, drilling debris, waste solids and the like with an effective amount of a nano-sized additive including, but not necessarily limited to alkaline earth metal oxides, alkaline earth metal hydroxides, alkali metal oxides, alkali metal hydroxides, transition metal oxides, transition metal hydroxides, post-transition metal oxides, and post-transition metal hydroxides. The additives may also reduce the amount of VES required to maintain a given viscosity. These viscoelastic surfactant gelled aqueous fluids may be used as treatment fluids for subterranean hydrocarbon formations, such as in hydraulic fracturing, gravel packing and the like. The magnesium oxide, zinc oxide or other nanometer scale-sized additives are at a scale that may provide unique particle charges that use chemisorption, crosslinking and/or other chemistries to associate the micelles and suspend the solids.

12 Claims, 7 Drawing Sheets

Related U.S. Application Data continuation-in-part of application No. 11/755,581, filed on May 30, 2007, now Pat. No. 7,550,413.filed on May 13, 2004, provisional application No. 60/815,693, filed on Jun. 22, 2006.

(56) References Cited

U.S. PATENT DOCUMENTS

| | | | | |
|---|---|---|---|---|
| 5,688,439 | A * | 11/1997 | Chopin et al. | 516/33 |
| 5,964,295 | A | 10/1999 | Brown et al. | |
| 6,035,936 | A * | 3/2000 | Whalen | 166/308.3 |
| 6,211,120 | B1 * | 4/2001 | Welch et al. | 507/270 |
| 6,258,859 | B1 * | 7/2001 | Dahayanake et al. | 516/77 |
| 6,432,885 | B1 * | 8/2002 | Vollmer | 507/236 |
| 6,605,570 | B2 * | 8/2003 | Miller et al. | 507/211 |
| 6,613,720 | B1 * | 9/2003 | Feraud et al. | 507/200 |
| 7,060,661 | B2 * | 6/2006 | Dobson et al. | 507/245 |
| 7,081,439 | B2 * | 7/2006 | Sullivan et al. | 507/269 |
| 7,151,076 | B2 * | 12/2006 | Qu et al. | 507/211 |
| 7,207,388 | B2 * | 4/2007 | Samuel et al. | 166/294 |
| 7,265,079 | B2 * | 9/2007 | Willberg et al. | 507/203 |
| 7,343,972 | B2 | 3/2008 | Willingham et al. | |
| 7,390,355 | B2 * | 6/2008 | Lyth | 106/401 |
| 7,544,643 | B2 * | 6/2009 | Huang | 507/270 |
| 2002/0042449 | A1 * | 4/2002 | Ohmori et al. | 516/79 |
| 2002/0193256 | A1 * | 12/2002 | Harris, Jr. | A01N 25/04 507/200 |
| 2003/0220204 | A1 * | 11/2003 | Baran, Jr. | B82Y 30/00 507/200 |
| 2003/0234103 | A1 * | 12/2003 | Lee et al. | 166/293 |
| 2004/0106525 | A1 * | 6/2004 | Willberg et al. | 507/200 |
| 2004/0147388 | A1 * | 7/2004 | Webber et al. | 501/128 |
| 2004/0152601 | A1 * | 8/2004 | Still et al. | 507/100 |
| 2005/0107265 | A1 * | 5/2005 | Sullivan et al. | 507/271 |
| 2007/0289781 | A1 * | 12/2007 | Rickman et al. | 175/65 |

* cited by examiner

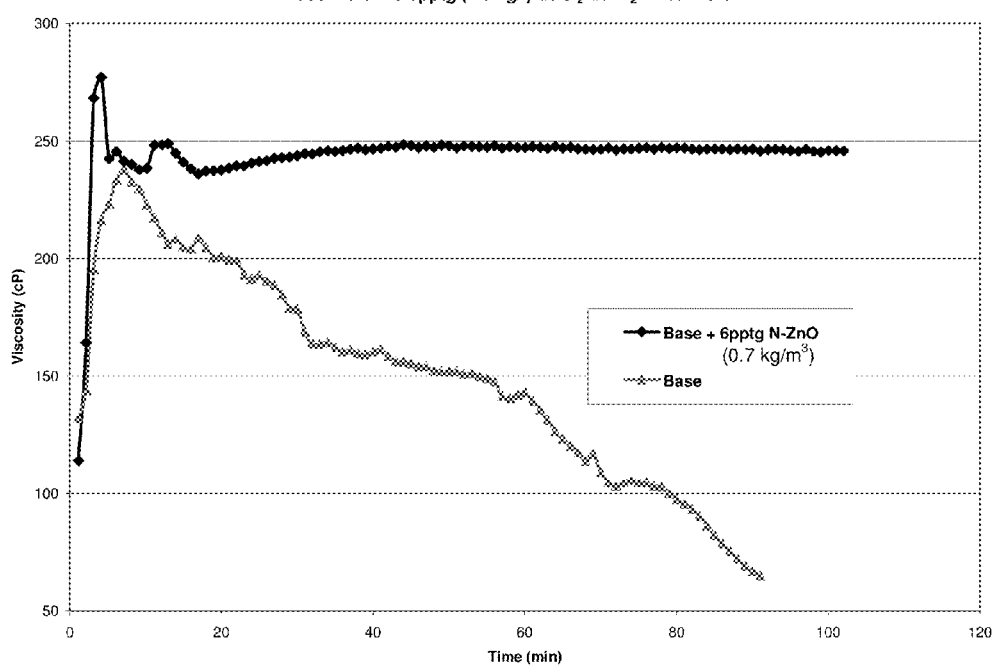

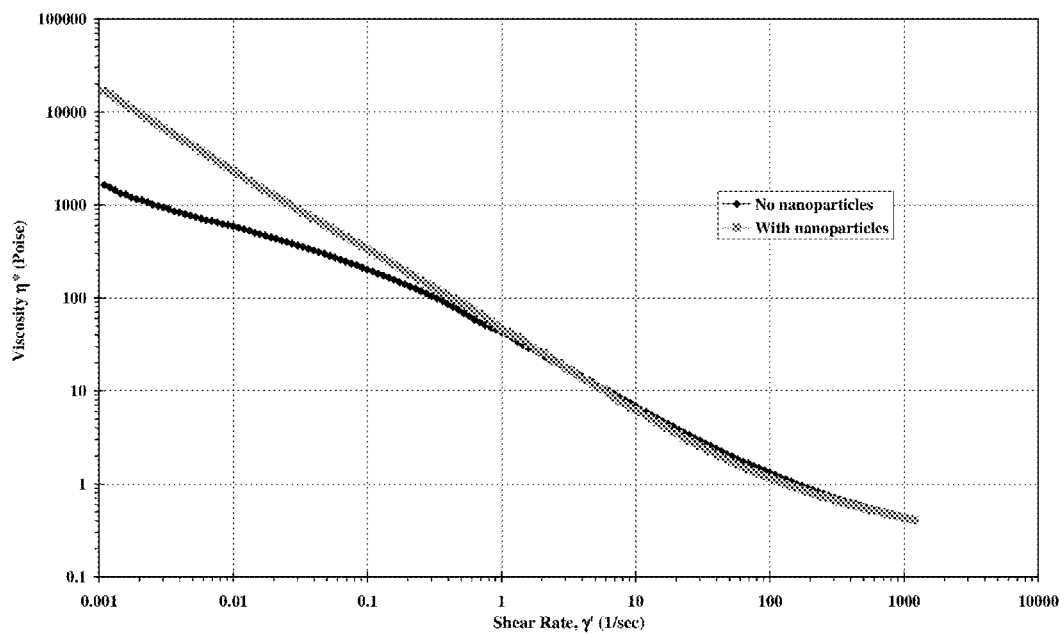
FIG. 7- Fluid Viscosities with and without Nanoparticles at Different Shear Rates at 80°F (27°C)
Fluid: 4%bv WG-3L + 13.0 ppg (1.6 kg/l) $CaCl_2/CaBr_2$  Nanoparticles: 0.077%bw 30nm ZnO

SOLIDS SUSPENSION WITH NANOPARTICLE-ASSOCIATED VISCOELASTIC SURFACTANT MICELLAR FLUIDS

CROSS-REFERENCE TO RELATED APPLICATIONS

This application is a continuation-in-part application of U.S. Ser. No. 11/849,820 filed Sep. 4, 2007, which in turn claims the benefit of U.S. Provisional Patent Application 60/845,916 filed Sep. 20, 2006, and is a continuation-in-part application of U.S. Ser. No. 11/125,465 filed May 10, 2006 which in turn claims the benefit of U.S. Provisional Patent Application 60/570,601 filed May 13, 2004, and is a continuation-in-part application of U.S. Ser. No. 11/755,581 filed May 30, 2007, which in turn claims the benefit of U.S. Provisional Patent Application 60/815,693 filed Jun. 22, 2006.

TECHNICAL FIELD

The present invention relates to aqueous fluids gelled with viscoelastic surfactants used during hydrocarbon drilling and recovery operations, and more particularly relates, in one non-limiting embodiment, to methods and additives for suspending solids in such viscoelastic surfactant-gelled aqueous fluids.

BACKGROUND

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which may cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

While polymers have been used in the past as gelling agents in fracturing fluids to carry or suspend solid particles in the brine, such polymers require separate breaker compositions to be injected to reduce the viscosity. Further, the polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations and the conductivity of propped fractures.

Aqueous fluids gelled with viscoelastic surfactants (VESs) are also known in the art. VES-gelled fluids have been widely used as gravel-packing, frac-packing and fracturing fluids because they exhibit excellent rheological properties and are less damaging to producing formations than crosslinked polymer fluids. VES fluids are also used as acid diverting, water and/or gas control fluids. VES fluids are non-cake-building fluids, and thus leave no potentially damaging polymer cake residue.

It has been discovered that alkaline earth metal oxides, alkaline earth metal hydroxides, transition metal oxides, transition metal hydroxides, and mixtures thereof, and in particular magnesium oxide may serve to inhibit or prevent fluid loss in aqueous fluids gelled with VESs, as described in U.S. patent application Ser. No. 11/755,581 filed May 30, 2007 (U.S. Patent Application Publication No. 2008/0060812 A1), incorporated herein in its entirety by reference. Some of these same materials may also be effective as system stabilizers and performance enhancers for aqueous fluids gelled with VESs, as described in U.S. patent application Ser. No. 11/125,465 (U.S. Patent Application Publication 2005/0252658 A1), also incorporated herein in its entirety by reference.

It would be desirable if a method and/or composition would be devised to suspend solids such as proppants, gravel, drilling debris, etc., even more effectively in viscoelastic surfactant gelled aqueous fluids.

SUMMARY

There is provided, in one form, a method for suspending solids in a gelled aqueous fluid that involves adding to an aqueous base fluid the following components in any order: a viscoelastic surfactant (VES) gelling agent, a particulate additive, and solids. The particulate additive is present in an amount effective to suspend the solids in the gelled aqueous fluid. The particulate additive has a mean particle size of from about 1 to about 500 nm and may include, but not necessarily be limited to, alkaline earth metal oxides, alkaline earth metal hydroxides, alkali metal oxides, alkali metal hydroxides, transition metal oxides, transition metal hydroxides, post-transition metal oxides, and post-transition metal hydroxides, and mixtures thereof. The solids may include, but not necessarily be limited to, proppants, gravel, drilling debris, waste solids, and combinations thereof.

There is additionally provided in another non-limiting embodiment a gelled aqueous fluid that includes an aqueous base fluid, a viscoelastic surfactant (VES) gelling agent, a particulate additive, and solids. The particulate additive may have a mean particle size of from about 1 nm to about 500 nm or less. Suitable particulate additives include, but are not necessarily limited to, alkaline earth metal oxides, alkaline earth metal hydroxides, alkali metal oxides, alkali metal hydroxides, transition metal oxides, transition metal hydroxides, post-transition metal oxides, and/or post-transition metal hydroxides. The solids include, but are not necessarily limited to, proppants, gravel, drilling debris, and/or waste solids. The particulate additive is present in an amount effective to suspend the solids in the viscoelastic surfactant gelled aqueous fluid.

The particulate additives, also referred to herein as suspension agents (e.g. magnesium oxide (MgO) and/or magnesium hydroxide ($Mg(OH)_2$), and the like), appear to improve the ability of VES micelle structures to suspend solids, even when heated, that is, the VES fluid viscosity is more stable over time even as fluid temperature is increased. The suspension agents have utility over a broad range of temperature of about 180° F. to about 300° F. (about 82° C. to about 149° C.). In many cases, clean-up of VES fluids may be improved by use of nano size particulate additives that may be much smaller than the pores and pore-throat passages within a hydrocarbon reservoir, thereby being non-pore plugging particles that are easier to be removed and less damaging to the reservoir permeability, relative to using polymers. Additionally, the viscosity stability of the VES fluid may be further improved by use of nano-sized particles that are able to stay within the VES fluid and travel where the VES fluid goes, including any fluid which is leaked-off, that is, any VES fluid that invades and enters the reservoir pores during a treatment, such as during a gravel-pack, frac-pack, hydraulic frac, removing drilling debris in a drilling operation, disposing of particulate solid waste in a fluid at high solids loading, and the like. Since the nano-sized particulate additives stay within the VES fluid, they thereby continue to stabilize the viscosity of any leaked-off VES fluid. This is in contrast to larger size particulate additives that become bridged-off (i.e. which plate out and are left upon the reservoir face and prevented from entering the reservoir pores with the VES fluid), including VES stabilizer agents that are larger than about 500 to 1000 nanometers in size.

The addition of alkali metal oxides, such as lithium oxide; alkali metal hydroxides, such as potassium hydroxide; alkaline earth metal oxides, such as magnesium oxide; alkaline earth metal hydroxides, such as calcium hydroxide; transition metal oxides, such as titanium oxide and zinc oxide; transition metal hydroxides; post-transition metal oxides, such as aluminum oxide; and post-transition metal hydroxides (i.e. for all sizes of the stabilizing agents) to an aqueous fluid gelled with a VES may increase the ability of the fluid to suspend solids, may indirectly reduce the viscosity of the fluid, may reduce the rate of fluid leak-off into the reservoir, may improve the thermal stability of the fluid's viscosity, and may prevent or inhibit the precipitation-like phase separation of the viscoelastic surfactant by improving its high temperature aqueous solubility, and combinations of these effects. In particular, the VES-gelled aqueous fluids containing these agents may be more stable at high temperatures, such as at 200° F. (93° C.) or higher. This discovery allows the VES system to be used at a higher temperature, and helps minimize formation damage after hydraulic fracturing operations. The introduction of these additives to the VES systems could also possibly lower the amount of VES surfactant needed to obtain the stable fluid viscosity necessary to perform VES applications or treatments, particularly since less of the VES is lost due to oil-like phase separation, thermal degradation precipitation, and the like.

BRIEF DESCRIPTION OF THE DRAWINGS

FIG. 6 is a graph of fluid viscosity over time for a base fluid of 13.0 ppg (1.6 kg/liter) $CaCl_2/CaBr_2$ brines containing 4% by volume (bv) WG-3L VES surfactant measured at 250° F. (121° C.) and 100 1/s both with and without 6 pptg (0.7 kg/m³) nano-sized ZnO particles; and FIG. 7 is a graph of fluid viscosity over time for a base fluid of 13.0 ppg (1.6 kg/liter) $CaCl_2/CaBr_2$ brines containing 4% by volume (bv) WG-3L VES surfactant measured at 80° F. (27° C.) and different shear rates both with and without 0.077% bw 30 nm-sized ZnO particles.

DETAILED DESCRIPTION

Figures 1A, 1B:
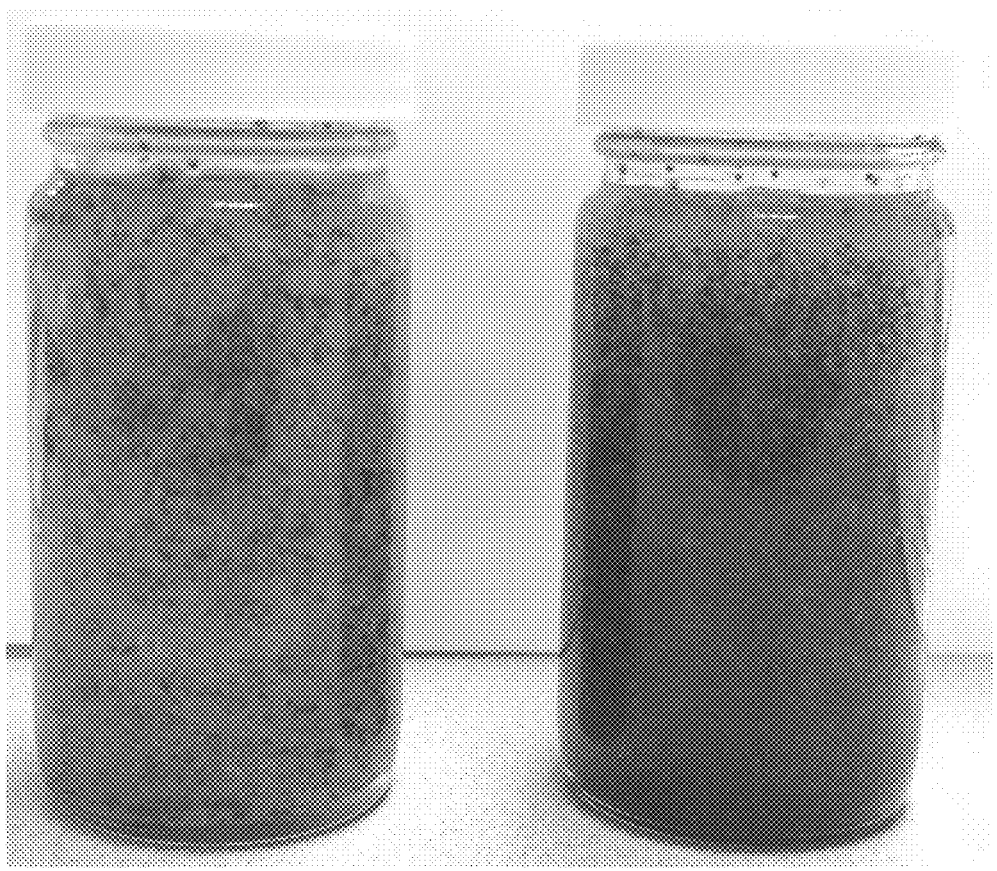
FIGS. 1 through 5 are photographs of two 13.0 ppg (1.6 kg/liter) $CaCl_2/CaBr_2$ brines containing 4% by volume (bv) WG-3L VES surfactant, with 0.077% by weight (bw) 30 nm ZnO additive (Fluid A on left) and without (Fluid B on right) at increasingly long time intervals.

It has been discovered that the addition of a small amount of nanoparticles in viscoelastic surfactant micellar fluids may effectively suspend solids therein for uniform distribution, for instance for the distribution of proppant in a fracture in hydraulic fracturing, for high gravel loading in gravel packing and frac-packing, for carrying drilling debris in drilling operations, and for high solids loading for waste disposal. Nanoparticles, such as nano-sized zinc oxide (ZnO), associate with surfactant micelles in aqueous viscoelastic surfactant solutions to build networks to prevent the carried solids from settling. As will be discussed below, lab testing shows that adding 0.07 percent bw 30 nanometer (nm) ZnO particles into VES-gelled surfactant solutions may suspend 1 pound per gallon (ppg) (0.1 kg/liter) 20/40 mesh (850-425 micron) high density ceramic proppant for 90 minutes without noticeable proppant settling. This is contrasted with the proppant settling to the bottom of a glass bottle within 10 minutes in an otherwise identical VES solution without adding the nanoparticles.

More specifically with respect to hydraulic fracturing treatments of underground oil and gas bearing formations, there are typically two stages of fluid pumping. In the first stage, a fluid that does not carry proppant is pumped to crack the formation and create fractures. In the second stage, proppant-carrying fluid is pumped into the fractures and transports proppant into the open fractures. During the pumping and fracture closure, the proppant settling rate has a remarkable influence on the final propped fracture geometry and well productivity increase. If the proppant settles too quickly, this causes the proppant to concentrate at the bottom part of the fractures before they close. The upper parts of the fractures will consequently close on little or no proppant, which generates little increased productivity by the fracturing treatment. The methods and compositions herein provide techniques and fluids for helping keep the proppant (and other solids) suspended during the second hydraulic fracturing step so that the proppant is uniformly distributed throughout the fractures.

Magnesium oxide particles and powders have been used as stabilizers for VES-gelled aqueous fluids at temperatures from about 180 to about 300° F. (about 82 to about 149° C.) as disclosed in U.S. patent application Ser. No. 11/125,465 (U.S. Patent Application Publication No. 2005/0252658 A1). However, it has been discovered that nano-sized particles of alkaline earth metal oxides, alkaline earth metal hydroxides, alkali metal oxides, alkali metal hydroxides, transition metal oxides, transition metal hydroxides, post-transition metal oxides, and post-transition metal hydroxides, and mixtures thereof have particular advantages for improving the suspension of solids, e.g. proppants in one non-limiting example, in a VES-gelled aqueous fluid.

It will be appreciated that although MgO and ZnO particles are noted throughout the application herein as representative or suitable types of alkaline earth metal oxide and/or alkaline earth metal hydroxide particle, other alkaline earth metal oxides and/or alkaline earth metal hydroxides and/or transition metal oxides, transition metal hydroxides, post-transition metal oxides, and post-transition metal hydroxides, may be used in the methods and compositions herein. Additionally, the alkali metal oxides and/or hydroxides may be used alone or in combination with the alkaline earth metal oxides and hydroxides, and/or together with one or more transition metal oxide, transition metal hydroxide, post-transition metal oxide, and post-transition metal hydroxide.

By "post-transition metal" is meant one or more of aluminum, gallium, indium, tin, thallium, lead and bismuth. In another non-limiting embodiment herein, the nano-sized particles are oxides and hydroxides of elements of Groups IA, IIA, IVA, IIB and IIIB of the previous IUPAC American Group notation. These elements include, but are not necessarily limited to, Na, K, Mg, Ca, Ti, Zn and/or Al.

In a specific instance, a post-transition metal oxide, ZnO, has been found to improve the ability of VES fluids to suspend proppants, as the ZnO test data show in the Examples.

The nano-sized MgO and ZnO particles are suspected of having additional chemistry useful for VES proppant improving ability. Without being limited to any one particular theory, it is suspected that some nano-sized MgO and ZnO particles have unique particle charges that use chemisorption, crosslinking and/or other chemistries to associate and stabilize the VES micelles. This technical improvement is helpful in the field when applying the MgO and ZnO additive technology, to assure VES-gelled proppant suspension.

The solid particulates and powders useful herein include, but are not necessarily limited to, slowly water-soluble alkaline earth metal oxides or alkaline earth metal hydroxides, or mixtures thereof. In one non-limiting embodiment, the alkali earth metal in these additives may include, but are not necessarily limited to, magnesium, calcium, barium, strontium, combinations thereof and the like. In one non-limiting embodiment, MgO may be obtained in high purity of at least 95 wt %, where the balance may be impurities such as $Mg(OH)_2$, CaO, $Ca(OH)_2$, $SiO_2$, $Al_2O_3$, and the like.

In another non-limiting embodiment, the particle size of the additives and agents ranges between about 1 nanometer independently up to about 500 nanometers. In another non-limiting embodiment, the particle size ranges between about 5 nanometers independently up to about 100 nanometer. In another non-restrictive version, the particles may have a mean particle size of about 10 nm or more, alternatively about 50 nm or less, and in another possible version about 40 nm or less.

The amount of nano-sized particles in the VES-gelled aqueous fluid may range from about 0.1 to about 50 pptg (about 0.01 to about 6 kg/1000 liters). Alternatively, the lower threshold of the proportion range may be about 1.0 pptg (about 0.1 kg/1000 liters), while the upper threshold of proportion of the particles may independently be about 20 pptg (about 2.4 kg/1000 liters) pptg. Thus far, the proportion of nanoparticles has not been noticed as tied to the solids loading in the fluid.

The nano-sized particles herein may be added along with the VES fluids prior to pumping downhole or other application. The VES-gelled aqueous fluids may be prepared by blending or mixing a VES into an aqueous fluid. The aqueous base fluid could be, for example, water, brine, aqueous-based foams or water-alcohol mixtures. The brine base fluid may be any brine, conventional or to be developed which serves as a suitable media for the various concentrate components for carrying solids. As a matter of convenience, in many cases the brine base fluid may be the brine available at the site used in the completion fluid (for completing a well) or other application, for a non-limiting example.

More specifically, and in non-limiting embodiments, the brines may be prepared using salts including, but not necessarily limited to, NaCl, KCl, $CaCl_2$, $MgCl_2$, $NH_4Cl$, $CaBr_2$, $NaBr_2$, sodium formate, potassium formate, and other commonly used stimulation and completion brine salts. The concentration of the salts to prepare the brines may be from about 0.5% by weight of water up to near saturation for a given salt in fresh water, such as 10%, 20%, 30% and higher percent salt by weight of water. The brine may be a combination of one or more of the mentioned salts, such as a brine prepared using NaCl and $CaCl_2$ or NaCl, $CaCl_2$, and $CaBr_2$ as non-limiting examples. In another non-limiting example, the use of the nanoparticles of this invention may work better in the higher salinity brines, such as 20% to 30% and higher salt by weight of water, particularly as fluid temperature increases.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include ClearFRAC™, which may also comprise greater than 10% of a glycol. This patent is incorporated herein in its entirety by reference. One useful VES is an amine oxide. As noted, a particularly preferred amine oxide is tallow amido propylamine oxide (TAPAO), sold by Baker Oil Tools as SurFRAQ™ VES. SurFRAQ is a VES liquid product that is 50% TAPAO and 50% propylene glycol. These viscoelastic surfactants are capable of gelling aqueous solutions to form a gelled base fluid. The additives of this invention may also be used in Diamond FRAQ™ which is a VES system, similar to SurFRAQ, which contains VES breakers sold by Baker Oil Tools.

The amount of VES included in the fracturing fluid, as one non-limiting embodiment of a treatment fluid herein, depends on two factors. One involves generating, creating or producing enough viscosity to control the rate of fluid leak off into the pores of the fracture, which is also dependent on the type and amount of fluid loss control agent used, and the second involves creating, generating or producing a viscosity high enough to develop the size and geometry of the fracture within the reservoir for enhanced reservoir production of hydrocarbons and to also keep the proppant particles suspended therein during the fluid injecting step, in the non-limiting case of a fracturing fluid. As described herein, the nano-sized particulate additives have been found to help with suspending solids such as proppants. Thus, depending on the application, the VES is added to the aqueous fluid in concentrations ranging from about 0.5 to 12.0% by volume of the total aqueous fluid (5 to 120 gallons per thousand gallons (gptg)). In another non-limiting embodiment, the proportion range herein may be from about 1.0 to about 6.0% by volume VES product. In an alternate, non-restrictive embodiment, the amount of VES ranges from 2 to about 10 volume %.

In application, the ZnO or MgO (or other particulate) additives may be mixed with the VES-gelled fluids at the surface in any order with the solids and the VES before they are pumped downhole. Of course, in the embodiment where the nanoparticle additives are helping suspend drilling debris during drilling operations, no solids are in the VES-gelled fluids containing the nanoparticle additives being injected into the wellbore, but the fluid encounters and suspends the drilling debris downhole and transports it out of the hole. Similarly, when the compositions described herein are used for waste disposal, such as in ore processing in one non-limiting embodiment, they are pumped to an area where solids are encountered and suspended for transport to removal and disposal zones. In another non-limiting embodiment, solid waste or ashes from power generation plants can be suspended and injected into an underground formation for disposal. In still another non-limiting embodiment, natural occurring radioactive material (NORM), such as scale, is often removed from wellbore tubing and casing can be suspended and injected into an underground formation for disposal.

It is expected that high solids loadings may be achieved with the compositions of this invention, for instance, up to about 20 pounds per gallon (2.4 kg/liter) fluid solids loading. Thus far, the researchers have not seen that the nanoparticles' loading is directly tied to the quantity of the solids loading, e.g. proppants. In one non-limiting explanation, the nanoparticles' pseudo-crosslinking of the VES micelles is thought to build network structures inside the VES-gelled fluid to hold or suspend the proppant from quick settling, possibly by associating the worm-like or elongated micelles together. The size of the solids being suspended may range from about 100 mesh to about 8 mesh (about 150 to about 2,360 microns).

In hydraulic fracturing applications, propping agents are typically added to the base fluid after the addition of the VES. Propping agents include, but are not limited to, for instance, quartz sand grains, glass and ceramic beads, bauxite grains, sintered bauxite, sized calcium carbonate, other sized salts, walnut shell fragments, aluminum pellets, nylon pellets, and the like. Gravel used for screens may also be of similar materials. The propping agents are normally used in concentrations between about 1 to 14 pounds per gallon (120-1700 kg/m$^3$) of fracturing fluid composition, but higher or lower concentrations may be used as the fracture design requires. A typical proppant size is 20/40 mesh (from 850 to 425 microns), although of course other sizes may be employed. The base fluid may also contain other conventional additives common to the well service industry such as water wetting surfactants, non-emulsifiers and the like. In the methods and compositions herein, the base fluid may also contain additives which may contribute to breaking the gel (reducing the viscosity) of the VES fluid.

While the viscoelastic fluids herein are described most typically herein as having use in fracturing fluids, it is expected that they will find utility in completion fluids, gravel pack fluids, fluid loss pills, lost circulation pills, diverter fluids, foamed fluids, stimulation fluids, water and/or gas control fluids, enhanced oil recovery (i.e. tertiary recovery) fluids, and the like.

In another non-restrictive embodiment, the treatment fluid may contain other viscosifying agents, other different surfactants, clay stabilization additives, scale dissolvers, biopolymer degradation additives, and other common and/or optional components.

In a particularly useful embodiment herein, use of these particulate additives with internal VES breakers, such as polyenoic acid, may have synergistic clean-up effects for the nano size particle-containing VES fluid. The nano-sized particle particulate agents may reduce or inhibit oil-like phase separation of the leaked-off VES fluids within the reservoir pores and with internal breaker present to reduce the leaked-off VES fluid's viscosity more rapid and possibly more complete VES fluid removal may be achieved, with return permeability as high as 90% and greater.

The invention will be further described with respect to the following Examples which are not meant to limit the invention, but rather to further illustrate the various embodiments.

EXAMPLE 1

Proppant Settling Tests

It is the nanoparticles associating with VES micelles in VES solutions that are believed to build relatively strong networks for high proppant loading, in one non-limiting embodiment, and thus uniformly distribute proppant into the fracture, thus avoiding quick proppant settling at the bottom of the fracture. In this Example 1, two fluids were prepared:

Fluid A: 13.0 ppg (1.6 kg/l) $CaCl_2/CaBr_2$ brine containing 4% bv WG-3L VES surfactant, with 0.077% bw 30 nm ZnO particulate additive (product #30N-0801 available from Inframat Advanced Materials).

Fluid B: 13.0 ppg (1.6 kg/l) $CaCl_2/CaBr_2$ brine containing 4% bv WG-3L VES surfactant, with no nanoparticles.

One hundred (100) milliliters of both Fluids A and B were mixed each with 12 grams 20/40 mesh (850-425 micron) proppant (CarboHSP high strength ceramic proppant, available from Carbo Ceramics) separately. At the same, both of the mixed fluids were poured into two glass bottles and photographs were taken at different times. In all photographs, FIGS. 1-5, Fluid A is on the left and Fluid B is on the right.

The photograph of FIG. 1 was taken 1 minute after pouring and the proppants in both fluids appear fully suspended.

Figures 2A, 2B:

The photograph of FIG. 2 was taken 10 minutes after pouring, and it may be readily seen that the proppant in Fluid B has substantially settled.

Figures 3A, 3B:

The photograph of FIG. 3 was taken 20 minutes after pouring, and it may be seen that the proppant in Fluid B has settled further from that shown in the photograph of FIG. 2.

Figures 4A, 4B:

The photograph of FIG. 4 was taken 30 minutes after pouring, and it may be seen that the proppant in Fluid B has settled somewhat further from that shown in the photograph of FIG. 3, while the proppant in Fluid A on the left was still suspended.

Figures 5A, 5B:

Finally, the photograph of FIG. 5 was taken 90 minutes after pouring, and it may be seen that the proppant in Fluid B has completely settled as compared with the proppant in Fluid A on the left which was still suspended substantially as it was when it was just poured (FIG. 1A).

EXAMPLE 2

Shown in FIG. 6 is a graph of fluid viscosity over time for a base fluid of 13.0 ppg (1.6 kg/liter) $CaCl_2$/$CaBr_2$ brines containing 4% by volume (bv) WG-3L VES surfactant measured at 250° F. (121° C.) and 100 1/s. The base fluid without 6 pptg (0.7 kg/m$^3$) nano-sized ZnO particles is the lower curve denoted by the gray triangles; the base fluid with 6 pptg (0.7 kg/m$^3$) nano-sized ZnO particles is the upper curve denoted by the black diamonds. This graph shows a large difference between the two fluids, one with and without nanoparticles, at a high temperature. This data demonstrate that the use of the method and compositions herein may be effective at high temperature.

EXAMPLE 3

FIG. 7 presents a graph of fluid viscosity over time for a base fluid of 13.0 ppg (1.6 kg/liter) $CaCl_2$/$CaBr_2$ brines containing 4% by volume (bv) WG-3L VES surfactant measured at 80° F. (27° C.) and different shear rates both with and without 0.077% bw 30 nm-sized ZnO particles. The curve for the fluid with the nano-sized ZnO particles is shown by gray squares, and the fluid without nanoparticles is shown by black diamonds. This data demonstrate that for very low shear rates, the VES-gelled compositions herein containing nanoparticles have more than 10 times higher viscosity than the VES-gelled fluid without nanoparticles. At higher shear rates, the viscosities are essentially the same.

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, specific combinations of viscoelastic surfactants with certain solids and particular additives such as alkaline earth metal oxides, alkaline earth metal hydroxides, alkali metal oxides, alkali metal hydroxides, transition metal oxides, transition metal hydroxides, post-transition metal oxides, and post-transition metal hydroxides, of various sizes, brines, viscoelastic surfactants, and other components falling within the claimed parameters, but not specifically identified or tried in a particular composition, are anticipated to be within the scope of this invention. In another non-limiting embodiment, the compositions and methods herein may find utility in delivering ZnO, MgO and similar materials in the fields of solid waste handling and disposal.

The words "comprising" and "comprises" as used throughout the claims are to be interpreted as "including but not limited to".

What is claimed is:

1. A method for suspending solids in a gelled aqueous fluid comprising adding to an aqueous base fluid in any order:
    a viscoelastic surfactant (VES) gelling agent;
    a particulate additive having a mean particle size of from about 1 to about 500 nm, selected from the group consisting of alkaline earth metal oxides, alkaline earth metal hydroxides, alkali metal oxides, alkali metal hydroxides, transition metal oxides, post-transition metal oxides, and mixtures thereof, where the transition metal in the transition metal oxide is titanium, and where the post-transition metal in the post-transition metal oxide is selected from the group consisting of gallium, indium, thallium, lead and bismuth; and
    solids selected from the group consisting of proppants, gravel, drilling debris, waste solids, and combinations thereof, and wherein the size of the solids ranges from about 100 mesh to about 8 mesh (about 150 to about 2,360 microns);
    where the particulate additive is present in an amount effective to suspend the solids in the gelled aqueous fluid.

2. The method of claim 1 where the aqueous base fluid is brine.

3. The method of claim 1 where:
    the alkaline earth metal is selected from the group consisting of magnesium, calcium, strontium, barium and mixtures thereof;
    the alkali metal is selected from the group consisting of lithium, sodium, potassium, and mixtures thereof; and
    the transition metal is titanium.

4. The method of claim 1 where the effective amount of the additive ranges from about 0.1 to about 50.0 pptg (about 0.01 to about 6 kg/1000 liters) based on the gelled aqueous fluid.

5. The method of claim 1 where the solids range in size from about 100 mesh to about 8 mesh (about 150 to about 2,360 microns).

6. The method of claim 1 further comprising:
    injecting the gelled aqueous fluid through a wellbore and into the subterranean formation; and
    treating the subterranean formation selected from the group consisting of
        fracturing the formation under effective pressure where the solids comprise proppant;
        packing the formation with gravel where the solids comprise gravel;
        stimulating the formation where the gelled aqueous fluid further comprises a stimulating agent;
        recovering drilling debris from the wellbore where the solids comprise drilling debris;
        completing a well; and
        controlling fluid loss where the gelled aqueous fluid further comprises a salt or easily removed solid; and
        mixtures thereof.

7. A method for suspending solids in a gelled aqueous fluid comprising adding to an aqueous brine base fluid in any order:
    a viscoelastic surfactant (VES) gelling agent;
    from about 0.1 to about 50.0 pptg (about 0.01 to about 6 kg/1000 liters) based on the gelled aqueous fluid of a particulate additive having a mean particle size of from about 1 to about 500 nm, selected from the group consisting of alkaline earth metal oxides, alkaline earth metal hydroxides, alkali metal oxides, alkali metal hydroxides, transition metal oxides, post-transition metal oxides, and mixtures thereof, where the transition metal in the transition metal oxide is titanium, and where the post-transition metal in the post-transition metal oxide is selected from the group consisting of gallium, indium, thallium, lead and bismuth; and solids selected from the group consisting of proppants, gravel, drilling debris, waste solids, and combinations thereof; and wherein the size of the solids ranges from about 100 mesh to about 8 mesh (about 150 to about 2,360 microns).

8. The method of claim 7 where:
the alkaline earth metal is selected from the group consisting of magnesium, calcium, strontium, barium and mixtures thereof;
the alkali metal is selected from the group consisting of lithium, sodium, potassium, and mixtures thereof; and
where the transition metal is titanium.

9. The method of claim 7 where the solids range in size from about 100 mesh to about 8 mesh (about 150 to about 2,360 microns).

10. The method of claim 7 further comprising:
injecting the gelled aqueous fluid through a wellbore and into the subterranean formation; and
treating the subterranean formation selected from the group consisting of
fracturing the formation under effective pressure where the solids comprise proppant;
packing the formation with gravel where the solids comprise gravel;
stimulating the formation where the gelled aqueous fluid further comprises a stimulating agent;
recovering drilling debris from the wellbore where the solids comprise drilling debris;
completing a well; and
controlling fluid loss where the gelled aqueous fluid further comprises a salt or easily removed solid; and mixtures thereof.

11. A method for suspending solids in a gelled aqueous fluid comprising adding to a brine base fluid in any order:
a viscoelastic surfactant (VES) gelling agent;
a particulate additive having a mean particle size of from about 1 to about 500 nm, selected from the group consisting of alkaline earth metal oxides, alkaline earth metal hydroxides, alkali metal oxides, alkali metal hydroxides, transition metal oxides, post-transition metal oxides, and mixtures thereof, where the transition metal in the transition metal oxide is titanium, and where the post-transition metal in the post-transition metal oxide is selected from the group consisting of gallium, indium, thallium, lead and bismuth; and
solids selected from the group consisting of proppants, gravel, drilling debris, waste solids, and combinations thereof, and wherein the size of the solids ranges from about 100 mesh to about 8 mesh (about 150 to about 2,360 microns);
where the particulate additive is present in an amount effective to suspend the solids in the gelled aqueous fluid; and
wherein the brine base fluid comprises a brine selected from the group consisting of NaCl, KCl, $CaCl_2$, $MgCl_2$, $NH_4Cl$, $CaBr_2$, $NaBr_2$, sodium formate, potassium formation, and combinations thereof.

12. A method for suspending drilling debris comprising:
suspending drilling debris in a gelled aqueous fluid comprising adding to an aqueous base fluid in any order:
a viscoelastic surfactant (VES) gelling agent;
a particulate additive having a mean particle size of from about 1 to about 500 nm, selected from the group consisting of alkaline earth metal oxides, alkaline earth metal hydroxides, alkali metal oxides, alkali metal hydroxides, transition metal oxides, transition metal hydroxides, post-transition metal oxides, post-transition metal hydroxides, and mixtures thereof, where the transition metal in the transition metal oxide is titanium, and where the post-transition metal in the post-transition metal oxide is selected from the group consisting of gallium, indium, thallium, lead and bismuth; where the particulate additive is present in an amount effective to suspend the drilling debris in the gelled aqueous fluid; and
drilling debris, wherein the size of the drilling debris ranges from about 100 mesh to about 8 mesh (about 150 to about 2,360 microns).

\* \* \* \* \*